US008849744B2

(12) United States Patent
Adams et al.

(10) Patent No.: US 8,849,744 B2
(45) Date of Patent: Sep. 30, 2014

(54) INCONSISTENCY ROBUSTNESS IN SCALABLE OLAP CUBES

(75) Inventors: Samuel S. Adams, Rutherfordton, NC (US); Douglas N. Kimelman, Winnipeg (CA); David Ungar, Mountain View, CA (US); Mark Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/434,685

(22) Filed: Mar. 29, 2012

(65) Prior Publication Data
US 2012/0260045 A1     Oct. 11, 2012

Related U.S. Application Data

(60) Provisional application No. 61/469,352, filed on Mar. 30, 2011.

(51) Int. Cl.
*G06F 7/00* (2006.01)
*G06F 17/30* (2006.01)

(52) U.S. Cl.
CPC .................. *G06F 17/30592* (2013.01)
USPC .......................................... 707/601

(58) Field of Classification Search
USPC ................. 711/144; 705/7.29; 707/601
See application file for complete search history.

(56) References Cited

U.S. PATENT DOCUMENTS

| | | | |
|---|---|---|---|
| 6,691,118 B1 * | 2/2004 | Gongwer et al. | 1/1 |
| 7,599,968 B2 * | 10/2009 | Pagnussat et al. | 1/1 |
| 2003/0196042 A1 * | 10/2003 | Hopeman et al. | 711/133 |
| 2004/0172346 A1 * | 9/2004 | Kanekar et al. | 705/30 |
| 2004/0196740 A1 * | 10/2004 | Sachedina | 368/46 |
| 2006/0212350 A1 * | 9/2006 | Ellis et al. | 705/14 |
| 2008/0243675 A1 * | 10/2008 | Parsons et al. | 705/37 |

* cited by examiner

*Primary Examiner* — April Y Blair
*Assistant Examiner* — Trang Ta
(74) *Attorney, Agent, or Firm* — McGinn IP Law Group, PLLC

(57) ABSTRACT

A method (and system) includes providing a memory including a plurality of named locations each holding a value and introducing at least one freshener. The at least one freshener chooses one of the plurality of named locations and re-computes its value.

24 Claims, 17 Drawing Sheets

| Time | Thread 1 (user 1) | Thread 2 (user 2) | Thread 3 (user 3) |
|---|---|---|---|
| T1 | Receive request for value of cell A | | |
| T2 | Look and see that cache for cell A is invalid | | |
| T3 | Get value of cell B (value = 10) | | |
| T4 | Get value of cell C (value = 20) | | |
| T5 | Get value of cell D (value = 40) | | |
| T6 | Begin calculating value of cell A; A=B+C+D | | |
| T7 | Still calculating B+C+D from gotten values | Set value of cell D to 100 | |
| T8 | Still calculating B+C+D from gotten values | Mark cache for cell A invalid | |
| T9 | Finish calculating B+C+D from gotten values (value = 70) | | |
| T10 | Set value in cache for cell A to 70 | | |
| T11 | Mark cache for cell A valid | | |
| T12 | Reply to request for value of cell A by returning the value 70 from cache for cell A | | |
| T13 | | | Receive request for value of cell A |
| T14 | | | Look and see that cache for cell A is valid |
| T15 | | | Reply to request for value of cell A by returning the value 70 from cache for cell A |

Figure 13

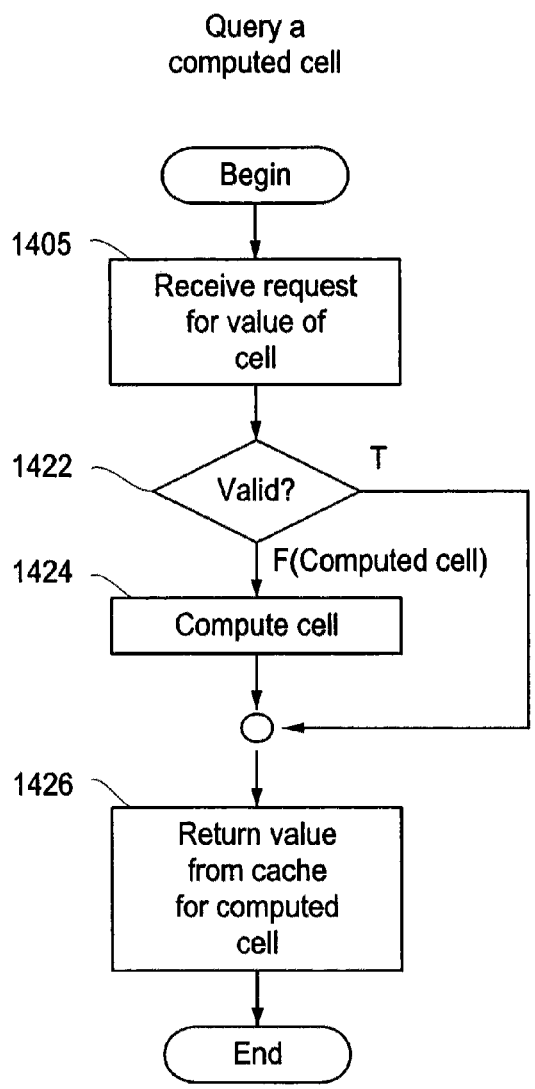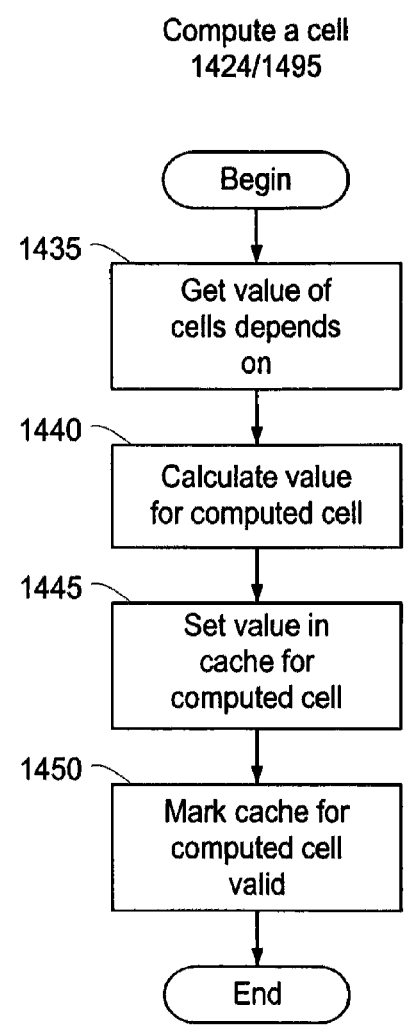
FIG.14A
FIG.14B

Figure 16
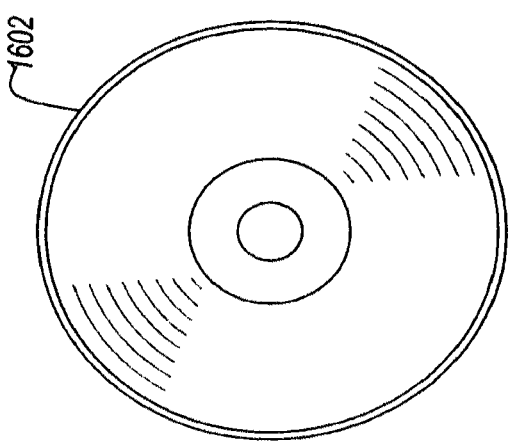
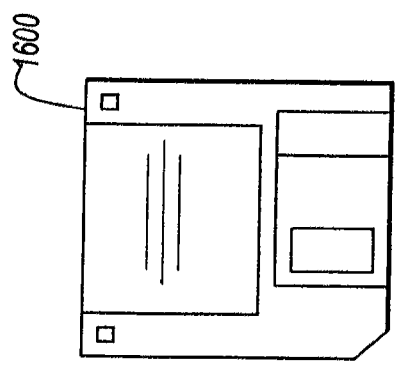

INCONSISTENCY ROBUSTNESS IN SCALABLE OLAP CUBES

CROSS REFERENCE TO RELATED APPLICATIONS

The present application claims priority to U.S. Provisional Application 61/469,352 filed on Mar. 30, 2011, the subject matter of which is incorporated herein in its entirety.

BACKGROUND OF THE INVENTION

1. Field of the Invention

The present invention generally relates to parallel processing in large-scale information systems. More specifically, the present invention provides a method (and system) for addressing inconsistency in large-scale information systems without synchronization.

2. Description of the Related Art

Computationally demanding business analytics applications will soon have systems with petabytes of memory and tens of thousands of processor cores. These applications need to respond rapidly to high-volume, high-velocity, concurrent request streams containing both queries and updates. Typical synchronization techniques are prohibitively expensive when scaling to these levels of parallelism. Even if synchronization operations themselves were to remain efficient, Amdahl's law would limit the scalability of performance. Without synchronization, however, errors will arise from data races.

Business analytics broadly is a source of ever more challenging performance and scalability requirements. Within business analytics, financial performance management is one example of a demanding business application domain. On a regular basis (e.g., quarterly) enterprises engage in financial planning, forecasting, and budgeting. End-users explore the enterprise's finances, compare plans to actual results, construct financial models, and experiment with what-if-scenarios, refining the plan in an iterative fashion. As deadlines approach in a globally distributed enterprise, thousands of users could be collaborating remotely. Some users review continually-updated high-level consolidated financial performance measures aggregated from tens of gigabytes of data. Other users perform localized detailed data entry and review, continually refining the data as they strive to meet targets. Ultimately, they all converge to a finalized plan.

One advanced technology that can support this kind of financial performance management scenario is interactive (or "real-time") concurrent update (or "write back") in-memory Multidimensional Online Analytic Processing ("MOLAP") cube technology. Distinguishing features of this technology compared to other forms of Online Analytic Processing ("OLAP") technology, such as Relational Online Analytic Processing ("ROLAP"), Hybrid Online Analytic Processing ("HOLAP"), and other known techniques, include the ability for users to change previously-entered cube data values on the fly and enter new data values into the cube, the ability to have those changes reflected in computed or aggregated data values whenever the user next requests that data values be recalculated, sufficient query response time for interactive use, and the ability to allow multiple users to access a set of linked cubes concurrently. To support these features, the implementation keeps all data in memory, does not pre-compute aggregations or materialized views, calculates and caches aggregated and computed values on demand, and employs highly efficient and compact data structures to represent the highly multidimensional and sparse data sets.

A problem with the above technique arises when multiple threads simultaneously update the data and caches of a cube. In this situation, the cached value of a cell in the cube may become permanently out of date or stale.

Conventionally, this problem is solved by locking. While locking will prevent this problem from occurring, locking causes the system to become slow and prevents scaling by limiting concurrent access to the set of linked cubes.

SUMMARY OF THE INVENTION

In view of the foregoing, and other, exemplary problems, drawbacks, and disadvantages of the conventional systems, it is an exemplary feature of the present invention to provide a method (and structure) for addressing inconsistency in large-scale information systems without synchronization.

Specifically, the present invention addresses inconsistency in large-scale information systems. More specifically, the present invention addresses inconsistency arising out of non-determinism, in place of synchronization, in an effort to achieve scalability on massively-parallel low-latency systems. To the extent that an application remains acceptable to its end users with respect to their business needs, an exemplary feature of the present invention is to permit, or no longer attempt to prevent, inconsistency relating to the order in which concurrent updates and queries are received and processed.

According to certain exemplary aspects of the present invention, a method and system is provided that is able to reduce the duration and amount of inconsistency, yet achieve scalability by using a minimum of synchronization, if any.

In an exemplary embodiment, the present invention address a problem drawn from the general field of OLAP technology. The specific problem relates to interactive concurrent-update in-memory MOLAP cubes.

As indicated above, as input values in the cubes are updated, the cached value of a cell in the cube may become permanently out of date or stale. Instead of locking the system, the present invention allows the invalidation of previously-cached computations to proceed in parallel and unsynchronized with the computation of new values to be cached. This lack of synchronization sometimes results in caching stale values. Such values are already out of date and hence inconsistent with the values of the inputs on which the computation is based.

To address the potentially stale values, the method and system, according to an exemplary aspect of the present invention, introduces a freshener. A freshener is a thread that, instead of responding to user requests, selects (i.e., repeatedly selects) a cached value according to some strategy, and re-computes that value from its inputs, in case the value had been inconsistent. Experimentation with a prototype showed that on a 16-core system with a 50/50 split between workers and fresheners, fewer than 2% of the queries would return an answer that had been stale for at least eight mean query times. These results suggest that tolerance of inconsistency can be an effective strategy in circumventing Amdahl's law.

Thus, unlike certain conventional techniques that seek the smallest feasible amount of synchronization to guarantee consistency, the exemplary method and system of the present invention may eliminate synchronization entirely. As discussed above, without synchronization, errors may arise from data race conditions. In accordance with certain exemplary features of the present invention, the proposed method and system repairs errors instead of preventing them. In other words, such a system will sometimes deliver inconsistent results. The key to usability will lie in reducing the frequency and magnitude of the errors, and the longevity of the inconsistent results.

To achieve the above exemplary features and objectives, in a first exemplary aspect of the present invention, a method includes providing a memory including a plurality of named locations each holding a value and introducing at least one freshener. The at least one freshener chooses one of the plurality of named locations and re-computes its value.

In a second exemplary aspect of the present invention, a system includes a memory including a plurality of named locations each holding a value and a unit that introduces at least one freshener. The at least one freshener chooses one of the plurality of named locations and re-computes its value.

In a third exemplary aspect of the present invention, a non-transistory computer-readable storage medium tangibly embodies a program of computer-readable instructions executable by a digital processing apparatus to perform a method, the method including providing a memory including a plurality of named locations each holding a value and introducing at least one freshener. The at least one freshener chooses one of the plurality of named locations and re-computes its value.

In a fourth exemplary aspect of the present invention, a system includes one or more computer processing units including one or more storage units having one or more data structures, the data structures including a plurality of cells, the cells having a value, and a unit that introduces at least one freshener. The at least one freshener chooses one of the plurality of cells and re-computes its value.

With the above and other unique and unobvious exemplary aspects of the present invention, it is possible to address inconsistency in large-scale information systems without synchronization. Additionally, it is possible to repair data errors instead of preventing them by locking users from accessing the system.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 13 illustrates an exemplary sequence producing a persistently stale result;

FIGS. 14A-14D illustrate a method 1400 in accordance with an exemplary aspect of the present invention;

FIG. 16 illustrates storage media tangibly embodying a program of machine-readable instructions executable by a digital data processor to perform the method according to the exemplary embodiments of the present invention.

EXEMPLARY EMBODIMENTS OF THE INVENTION

Figure 1:
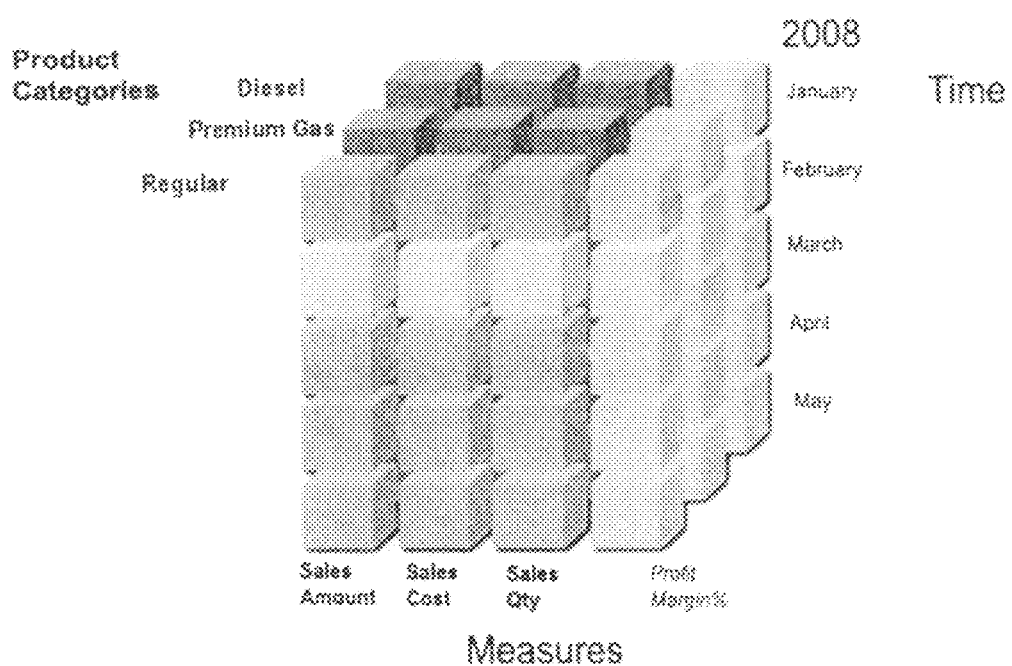
FIG. 1 illustrates an exemplary simple OLAP cube in accordance with an exemplary embodiment of the present invention.

Referring now to the drawings, and more particularly to FIGS. 1-16, exemplary embodiments of the method and structures according to the present invention will now be described.

As mentioned above, an exemplary embodiment of the method and system of the present invention is directed to interactive concurrent-update in-memory MOLAP cubes. From the perspective of an end-user who is working interactively with the MOLAP cube, in accordance with an exemplary aspect of the present invention, the cube is somewhat like a multidimensional spreadsheet. For example, FIG. 1 depicts a simple cube. In the cube illustrated in FIG. 1, there is a Time dimension (vertical), a Product Category dimension (depth), and a Measure dimension (horizontal). Each dimension has an axis consisting of a number of values, such as "January", "February", etc. for the Time dimension. In an n-dimensional cube, each coordinate n-tuple in the Cartesian product of all of the axes (e.g., Sales Amount, January, Diesel), uniquely identifies a cell (a named location) of the cube, and each cell of the cube can hold a data value. Some cells hold values entered by a user, and other cells hold values that are computed according to formulae and/or aggregation structures that are part of the definition (or "schema" or "metadata") of the cube. Furthermore, in practice, cubes tend to be very sparse (i.e., many cells hold no value).

Rather than the axes of a cube being simply linear, the values along each axis of a cube can be arranged into a hierarchical structure.

Figure 2:
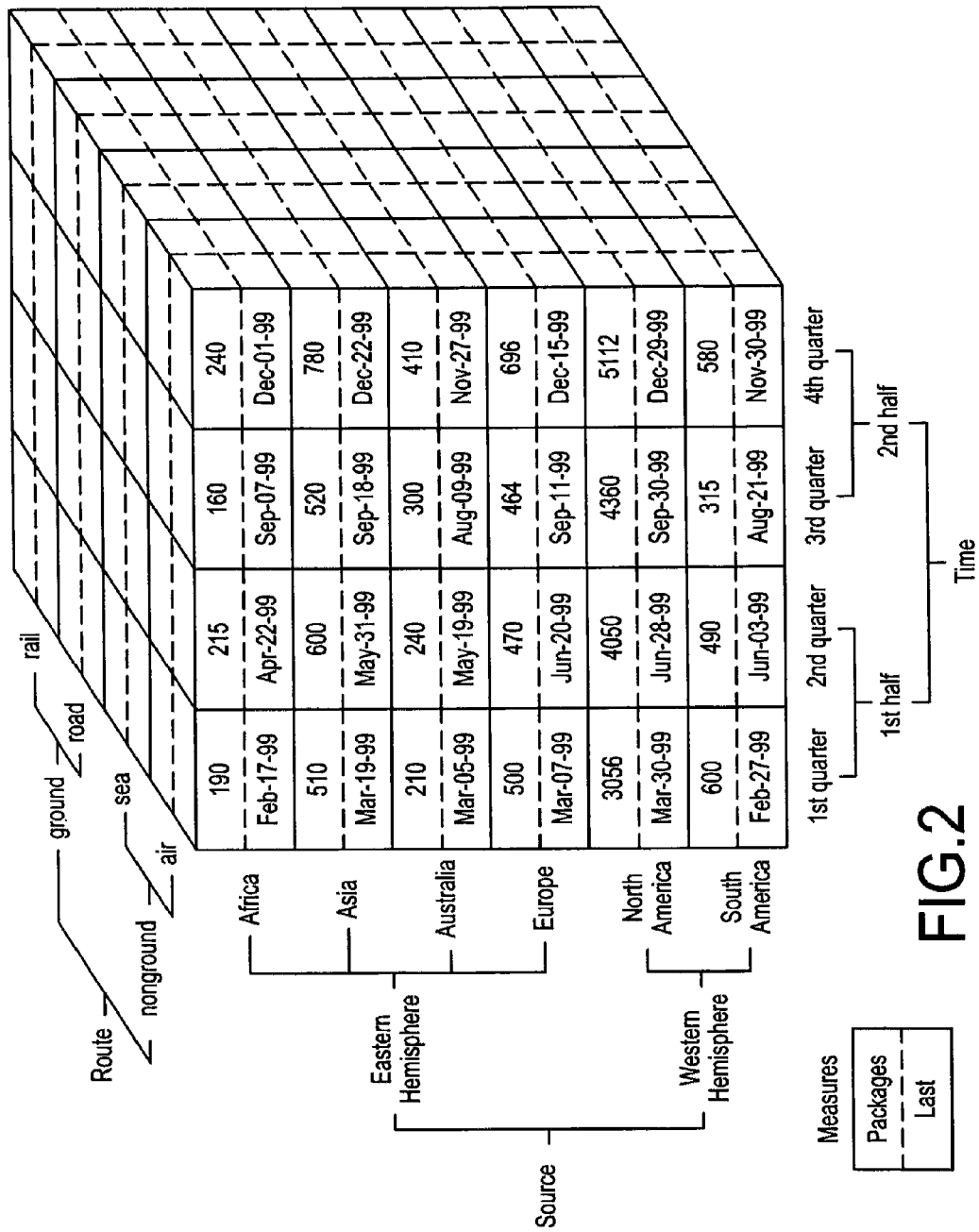
FIG. 2 illustrates an exemplary OLAP cube with hierarchies in accordance with an exemplary embodiment of the present invention.

FIG. 2 depicts another exemplary cube. The cube illustrated in FIG. 2 has three dimensions: Time, Source, and Route. Measures are depicted in FIG. 2 by a vertical subdivision of each cell. Alternatively, with some OLAP systems, measures might in fact be implemented by a fourth dimension. A hierarchy is shown in FIG. 2 for the values of each dimension's axis. It is entirely likely that queries will occur requesting the value of a cell whose coordinate in at least one dimension is not a leaf of that dimension's axis hierarchy. The hierarchies generally imply "aggregation" or "consolidation" (i.e., the value corresponding to an internal node of an axis hierarchy is often the (possibly weighted) sum of the values corresponding to the child nodes of the internal node). For example, the value of the cell (Route=air, Time=1st half, Source=Western Hemisphere, Measures=Packages) would be 8916, the sum of the values 3056, 4050, 600, and 490 (those being the values of the cells having coordinates "1st quarter" and "2nd quarter" (the children of "1st half") in the Time dimension and "North America" and "South America" (the children of "Western Hemisphere") in the Source dimension). The definition of the cube axes specifies the aggregation corresponding to each dimension.

Another way in which a cube definition specifies computation based on the structure of the cube is with formulae.

The following equation depicts a formula for yet another example cube, having a dimension named "Measure", as well as dimensions "Date", "Fish-type" and "Market":

['Purchase Cost-*LC*']=*N*:['Quantity Purchase-*Kgs*']*
   ['Price/*Kg-LC*']

The Measure dimension axis has values including: "Purchase Cost-LC", "Quantity Purchased-Kgs", and "Price/Kg-LC" (the cube in this example contains data concerning purchases of fish at various times in various markets). The formula above specifies, among other things, that the value of the cell at coordinates (Measure="Purchase Cost-LC", Date="January", Fish-type="Cod", Market="Fairbanks") would be calculated by evaluating the expression that multiplies the value of the cell at coordinates (Measure="Quantity Purchased-*Kgs*",
   Date="January",Fish-type="Cod",
   Market="Fairbanks")

by the cell at coordinates (Measure="Price/*Kg-LC*",Date="January",Fish-
   type="Cod",Market="Fairbanks").

In other words, for a given date, fish-type, and market, a purchase cost in local currency is obtained by multiplying the quantity purchased by the unit price. The formula concerns a hyperslice, not just a single cell, and the system fills in specific coordinates appropriately to calculate the value of a given cell of the hyperslice.

It is important to understand that both hierarchies and formulae give rise to flows of data within the cube. In fact, in some sense, the cube can be regarded as a regular array of interwoven and intersecting data flow networks.

Figure 3:
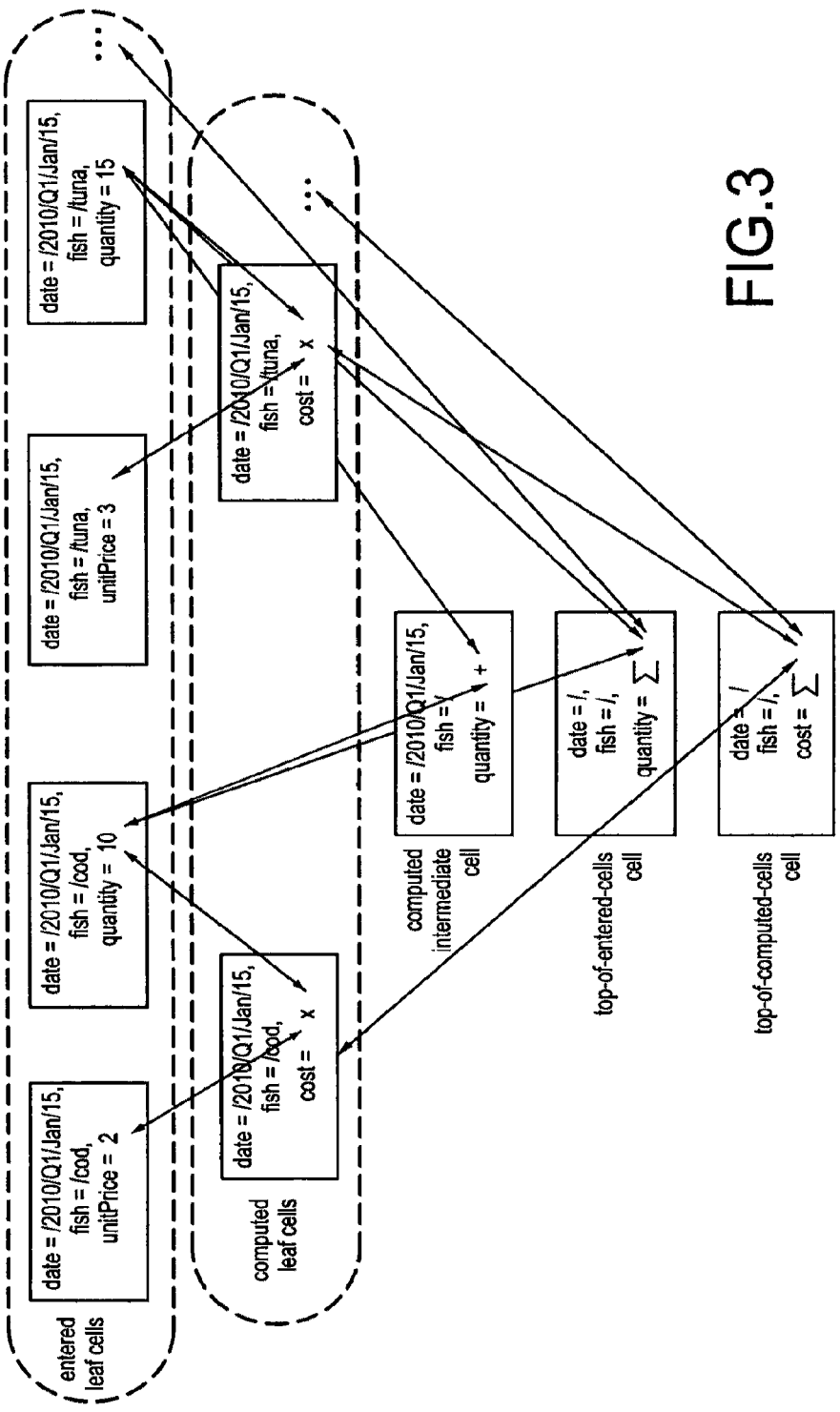
FIG. 3 illustrates the cells and interconnections for an exemplary OLAP cube in accordance with an exemplary embodiment of the present invention.

The computation arising out of aggregation and formula evaluation can be a bottleneck for an application that is based on the style of cubes present in FIGS. 1-3, with large amounts of data, large numbers of users, and high volumes of read and write requests. In order to optimize computation, a cube implementation can cache the values of computed cells. In any case, ever growing workloads have produced a desire to harness multicore CPUs and clusters. The combination of caching and parallelism has led to a need for synchronization, which in turn can limit scalability. The method and system according to certain exemplary embodiments of the present invention can harness more parallelism by tolerating a bounded amount of inconsistency.

According to certain exemplary embodiments, the present method and system models a cube as an unordered collection of cells, each represented by an object. A cell contains its coordinates in the cube, represented by a tuple locating the cell in N-space. For example, in a three-dimensional fish-market cube, as discussed above, the cell referring to the amount of cod sold on Apr. 15, 2000 would have a tuple with three coordinates: (fish=/cod, measure=/amount, date=/ 2000/Q2/April/15). Each element of the tuple represents a location in one of the dimensions of the cube, and, since each dimension is, in general, hierarchical, each coordinate is represented by a sequence giving a path from the root of the hierarchy. In this example, the coordinate sequence "/2000/ Q2/April/15" represents a path through the hierarchical date dimension down to a leaf of the axis of the dimension. This example cell would hold a number that was entered by a user, and is referred to as an entered (leaf) cell. In contrast, the cell containing the aggregate amount of cod sold in the year 2000 would have coordinates (fish=/cod, measure=/amount, date=/ 2000). It has a date coordinate that is not a leaf. This latter cell is called a computed cell, because, when queried for its contents, that cell will return a computed value: the sum of all of the entered cells containing amounts of cod for 2000.

The exemplary cube may include three kinds of computed cells:

1. top cells, which are cells at the top of the hierarchy in every dimension except the measure dimension;
2. intermediate cells, which are computed cells in intermediate levels of a hierarchy; and
3. leaf cells, which are computed and entered cells at the bottom level of a hierarchy. At this level, each coordinate represents a leaf in its dimension. These include computed leaves, which are possible as the result of formulae.

The cube, in accordance with the present exemplary embodiment, may include two types of top cells. Top-of-entered-cells are the two top cells that represent the sum over all time and all fish of either the amount of a sale or the unit-price of a sale and the (single) top-of-computed-cells cell, sums the total cost of a sale over all time and all fish. In the first case, the arguments to the summation are simply quantities entered by the user, but in the second case, they are products of pairs of unit-price and quantity cells. Thus, the cells are differentiated in two different ways. First, there is a dichotomy between entered and computed cells, where computed cells may either be aggregates or formulae results. Second, there are leaf, intermediate, and top cells. Table 1 below gives examples of these cells.

TABLE 1

Examples of various kinds of cells

| type of cell | contents | fish | date | measure |
|---|---|---|---|---|
| entered leaf | contents entered by user | /cod | /2002/Q2/April/15 | /unitPrice |
| computed leaf | For cod on April 15, | /cod | /2002/Q2/April/15 | /cost |
| (computed) intermediate cell | total cost of all fish in April | / | /2002/Q2/April | /cost |
| top of entered cells | total quantity of all fish for all time | / | / | /quantity |
| top of computed cells | total cost of all fish for all time | / | / | /cost |

The representation employed by implementation of the present embodiment of the invention includes both forward and backward pointers so that each computed cell can find all of the cells that its contents depend on, and so that each cell can find all of the computed cells depending on it (e.g., as is illustrated in FIG. 3). When adding an aggregation (computed) cell, the cell is linked to all of the entered cells on which it ultimately depends, rather than just being linked to immediate lower-level aggregations. This choice simplifies the implementation, especially with respect to the addition of a newly materialized intermediate-level cell.

Figure 4:
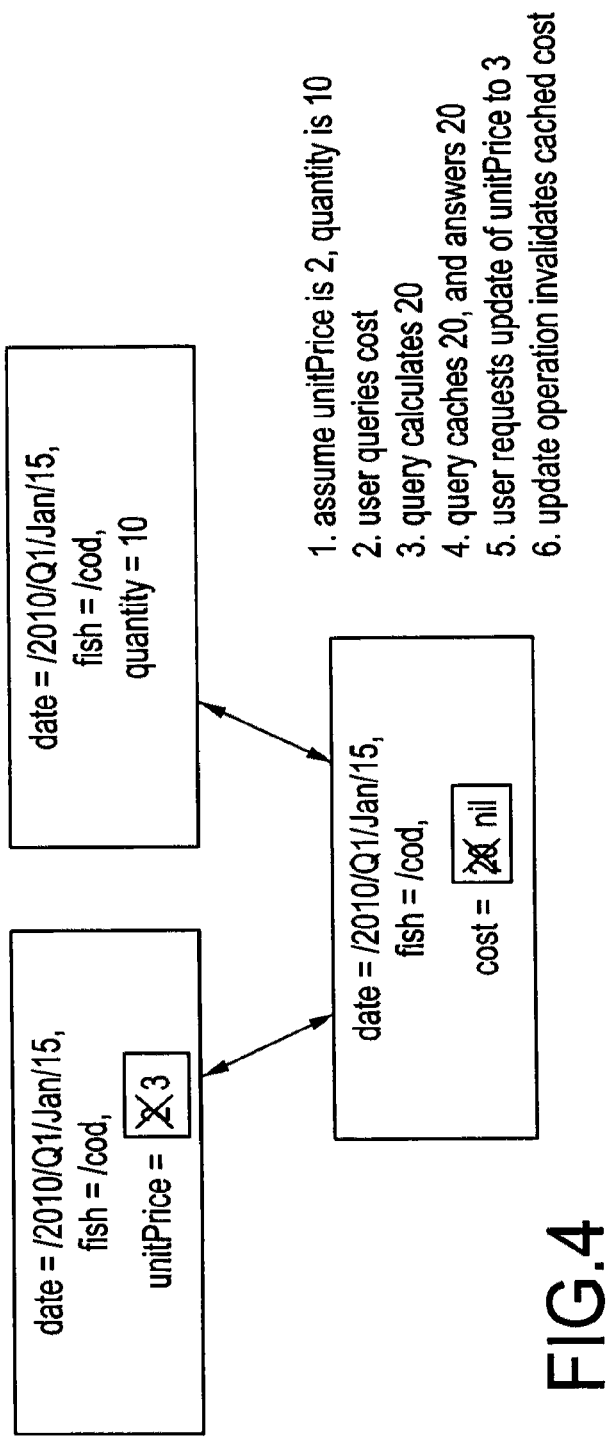
FIG. 4 illustrates an exemplary sequence for an unsynchronized parallel implementation of an exemplary OLAP cube in accordance with an exemplary embodiment of the present invention.
Figure 5:
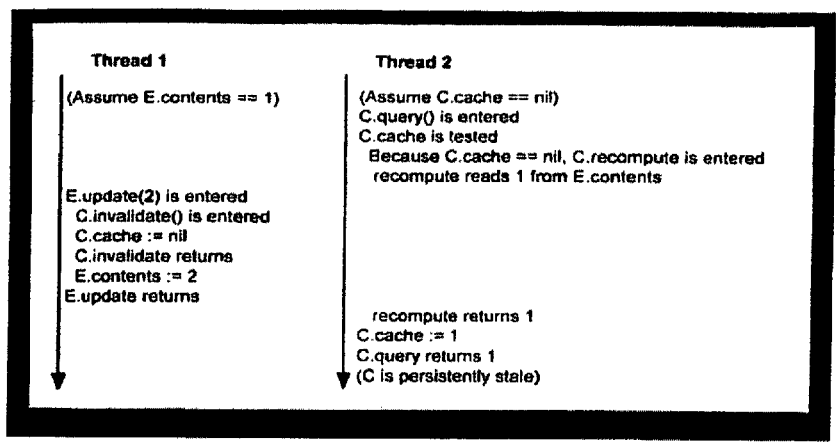
FIG. 5 illustrates an exemplary sequence producing a persistently stale result.

Since a cube may contain many computed cells that are not of interest at any given time, it may be possible to defer the computation until the value is needed by a user. Furthermore, since a user may examine the value of a computed cell many times before there is a change to the contents of any of the cells on which that computed cell depends, it also seems reasonable to cache the contents of a computed cell. Thus, a serial implementation, or a naive unsynchronized parallel implementation of OLAP cube includes the following algorithms, as illustrated in FIG. 4. When a computed cell is asked for its contents, if the value is not already cached, the cell computes the value, caches it, and returns it. When the contents of an entered cell are changed, the cell empties (i.e., "invalidates") the caches of all of the computed cells that (transitively) depend upon it. (The invalidation propagation need not continue transitively beyond a computed cell that is already invalid).

If queries and updates can happen concurrently, it is possible in the absence of synchronization for a computed cell to cache a result that is inconsistent with the source data. For instance, a computed cell could return the value 3 even though both of the entered cells it aggregates contain the value 1, possibly because one of those entered cells previously contained the value 2. Furthermore, this inconsistency could persist forever. The following example, consisting of an entered cell E, and a computed cell C, where C's value is supposed to be the same as E's value, illustrates this point. It is assumed that two public operations, query, which returns the cell's value, and, for entered cells only, update, which sets the cell's value to its argument. Below is an exemplary pseudo-code for the cells:

```
class EnteredCell extends Cell {
    private int contents;
    int query( ) { return contents; }
    void update(int x) {
        for all dependent cells, c:
            c.invalidate( );
        contents := x; // (The problem does not essentially change
        if this line is at the top of this function.)
    }
}
class ComputedCell extends Cell {
    private int cache := nil;
    void invalidate( ) { cache := nil; }
    private int re-compute( ) {
        // re-compute my contents by querying the cells I depend upon
        ...
    }
    int query( ) {
        if (cache == nil) cache := re-compute( );
        return cache;
    }
}
```

Although this pseudo-code is quite natural for serial operation, it will not work reliably when one thread's query to computed cell C overlaps another thread's update to entered cell E. That is, for example, consider what happens if the query of C's value causes its re-computation, the re-computation reads E's value before it is updated, and the invalidation of C's cache caused by updating E's value occurs during the re-computation of C (i.e., before the end of the re-computation). In that case, the re-computation will be based on E's old value, yet the result will be stored in C's cache, as if it were current. Since C's cache will seem to be current, all future queries to C (assuming no more updates to E), will yield an obsolete, inconsistent result. This scenario is exemplified in FIG. 5.

In the problematic scenario above, cell E is changed from 1 to 2, but (unless there are other invalidates of C), C.query( ) will continue to return the inconsistent stale value of 1. This unbounded inconsistency is referred to herein as persistent staleness. Standard design practice has been to eliminate this inconsistency with a variety of locking schemes. For example, a user who desired to modify entered data would obtain a lock that would prevent others from querying or updating the contents of computed cells. As discussed above, such a solution limits scalability and slows the operation of the system.

In contrast to the conventional locking techniques, the method and system according to certain exemplary embodiments of the present invention include approaches that tolerate but limit inconsistency. For example, the inventors have verified the scalability advantages of inconsistency, examined an optimization to reduce the creation of inconsistency, examined a first attempt to limit the longevity of inconsistency, and combined reduction of inconsistency creation with limitation of inconsistency longevity.

In addressing the above issues, the inventors used the following experimental framework:
  A configuration of independent variables was selected, for
    example, setting the number of worker threads,
  a new cube was generated with random initial values,
  the test code was run for five seconds,
  the dependent values were recorded.
This process was repeated for different configurations of independent variables. The platform for the experiments consisted of two distinct machines: Example 1) a system having a multicore design, with a relatively small number of cores, large caches, and extensive hardware support for cache-coherency, and Example 2) a system having a many core design, with far more cores, smaller caches, and less hardware support for cache coherency.

The scalability experiments examine the scalability advantages of inconsistency. Scalability is compared between an algorithm that permits inconsistency and one that does not, with the number of worker threads varying between one and the number of cores on the machine. In scalability experiments, for each run, the total number of queries and updates performed were measured in each five-second run. In the four scaling graphs illustrated in FIGS. 6 and 7, the number of operations completed in five seconds, summed across all worker threads, compared to the number of worker threads employed are plotted. On each machine, the maximum number of threads was limited to be the number of available cores.

Figure 6:
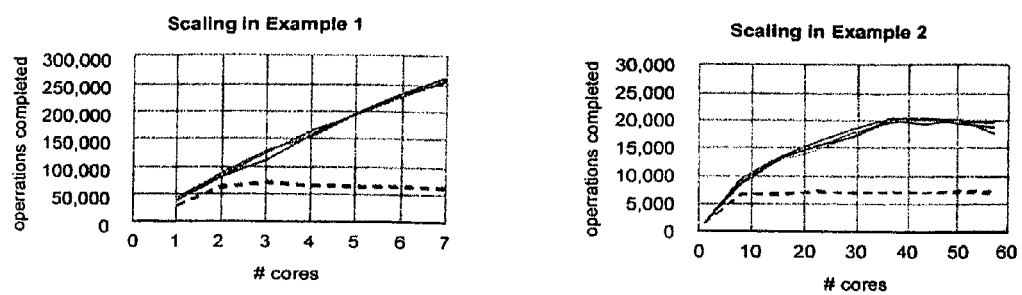
FIG. 6 illustrates a graphical comparison of an unsynchronized implementation vs. a simple locking implementation with respect to scaling, on each of two exemplary computing platforms in accordance with an exemplary aspect of the present invention.

FIG. 6 compares the scaling of the unsynchronized implementation (i.e., allowing unlimited inconsistency) with a simple locking implementation that allows multiple readers or one writer at a time (sacrificing scalability in order to achieve total consistency), as in certain conventional techniques. Each graph shows four runs of the unsynchronized cube, shown as solid lines, and four runs of the locking cube, shown as dotted lines. As expected, the locking implementation hits a scaling wall beyond four cores on the system in Example 1 and eight cores on the system in Example 2. From these measurements, it can be seen that a fully synchronous system does not scale, but one that does not synchronize does scale.

The inconsistency creation experiments examine the rate of creation of inconsistent results, as the number of worker threads increases. For the purposes of this experiment, each worker thread split its operations 50/50 between changing the contents of a randomly-chosen entered cell and querying the (cached) contents of an intermediate cell. As described above, the intermediate cell's cache is invalidated whenever a cell upon which it depends is changed. For this experiment, the focus is on the creation of persistent staleness, which is the situation described above in which a computed cell's cache is left with its valid flag set, but contains an obsolete result, which may never be corrected. An optimization to the basic code outlined above was tested. That is, any thread that invalidates a cache leaves behind a "breadcrumb", so that if a cache has been invalidated while being re-computed, the valid flag is not set when the re-computation completes. Below is exemplary code including the optimization, which is shown in italics. (The valid flag is represented by a non-nil value in the cache.)

```
class EnteredCell extends Cell {
    private int contents;
    int query( ) { return contents; }
    void update(int x) {
        for all dependent cells, c:
            c.invalidate( );
        contents := x;
    }
}
class ComputedCell extends Cell {
    private int lastThread := nil;
    private int invalidate( ) { cache := nil; lastThread := thisThread( ); }
    private int re-compute( ) {
        lastThread := thisThread( );
        // re-compute my contents by querying the cells I depend upon
        ...
    }
    private int cache := nil;
    int query( ) {
        if (cache == nil) x := re-compute( );
        if (lastThread == thisThread( )) cache := x;
        return x;
    }
}
```

Persistent staleness can still occur, if an invalidation occurs between the time ComputedCell.query( ) compares last-Thread to thisThread( ) and the time it sets cache:=x, because we did not lock/synchronize at that point. But because this is a much smaller window in time, this should occur much less frequently than the "race" that causes persistent staleness in the unoptimized code.

Figure 7:
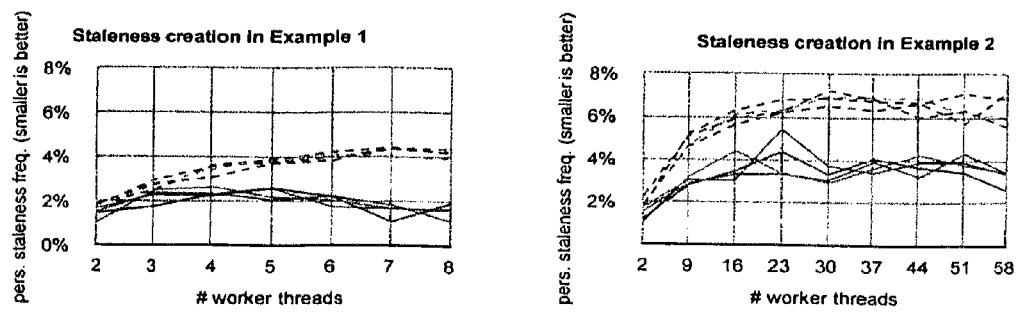
FIG. 7 illustrates a graphical comparison of an optimized implementation vs. an unoptimized implementation with respect to staleness creation, on each of two exemplary computing platforms in accordance with an exemplary aspect of the present invention.

This experiment measured the frequency at which the computed cell query operation returned a permanently stale value. FIG. 7 illustrates these results. Each graph shows four runs without the optimization described above, depicted as dashed lines, and four runs with the optimization, depicted as solid lines.

The inventors discovered that adding worker threads generally increases the rate of creation of inconsistent (i.e., stale) results. Also, the rate of staleness creation is reduced by the optimization of not marking the cache valid if another thread has invalidated it or begun re-computing it since the time that the re-computation began.

In the next examples, an exemplary aspect of the present invention attempts to remediate the inconsistency of results. A number of threads are devoted to repeatedly selecting a cell, according to some strategy (e.g., randomly, pattern, round-robin, etc.), and re-computing its value just in case it is a persistent stale value. In the context of certain exemplary embodiments of the present, these threads are referred to as freshener threads.

For this experiment, each worker thread uses half of its requests to change entered data without invalidating dependent caches. By omitting the invalidation, conditions are created under which inconsistent results are profligately created "artificially." This omission produces larger numbers of inconsistent results so that remediation can be studied more effectively. The other half of each worker's requests are spent reading (and re-computing, if necessary) the values of randomly-chosen intermediate cells.

What is measured is the frequency and duration of staleness of query results. For the purposes of this experiment, staleness is defined as follows:

If a query result matches the result of a re-computation, there is no staleness.

If a query result does not match the result of a re-computation, its staleness is the difference between the current time and the most recent time at which there was an update to an entered cell on which the computed cell depends.

A varying number of freshener threads are introduced that re-compute and restore cache contents. By re-computing and restoring cached values, the fresheners remove persistent staleness. Note that in some cases a freshener might re-compute and restore a cached value that in fact turns out to already be valid. In one strategy, each freshener chooses a cell to re-compute at random. In the other it uses a specific pattern (e.g., a round-robin pattern) to determine the cells or cells to re-compute.

Figure 8:
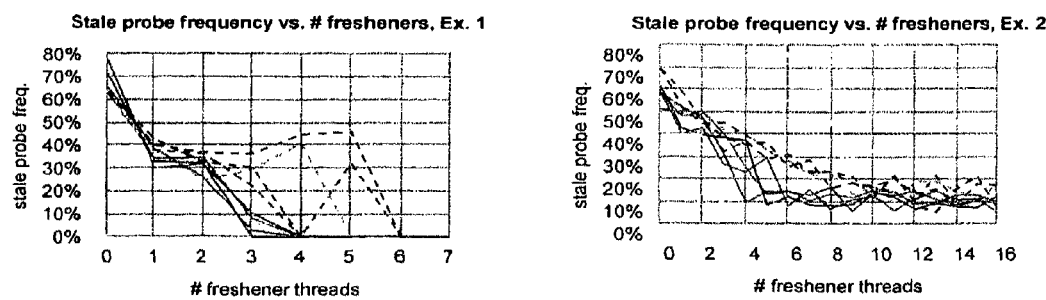
FIG. 8 illustrates a graphical comparison of a random freshening strategy vs. a round-robin freshening strategy with respect to reducing the frequency of queries returning stale results, as the number of freshener threads increases, on each of two exemplary computing platforms in accordance with an exemplary aspect of the present invention.

FIG. 8 presents the frequency data (i.e., what proportion of queries returned a stale result). For purposes of the present invention, a smaller number is desired in all graphs illustrated in FIG. 8. Each graph shows four runs with random fresheners, depicted as dashed lines, and four runs with round-robin fresheners, depicted as solid lines.

The inventors discovered that, without any fresheners at all, the stale probe frequency is very high. Alternatively, the inventors discovered that adding freshener threads generally reduces the frequency of stale results.

Figure 9:
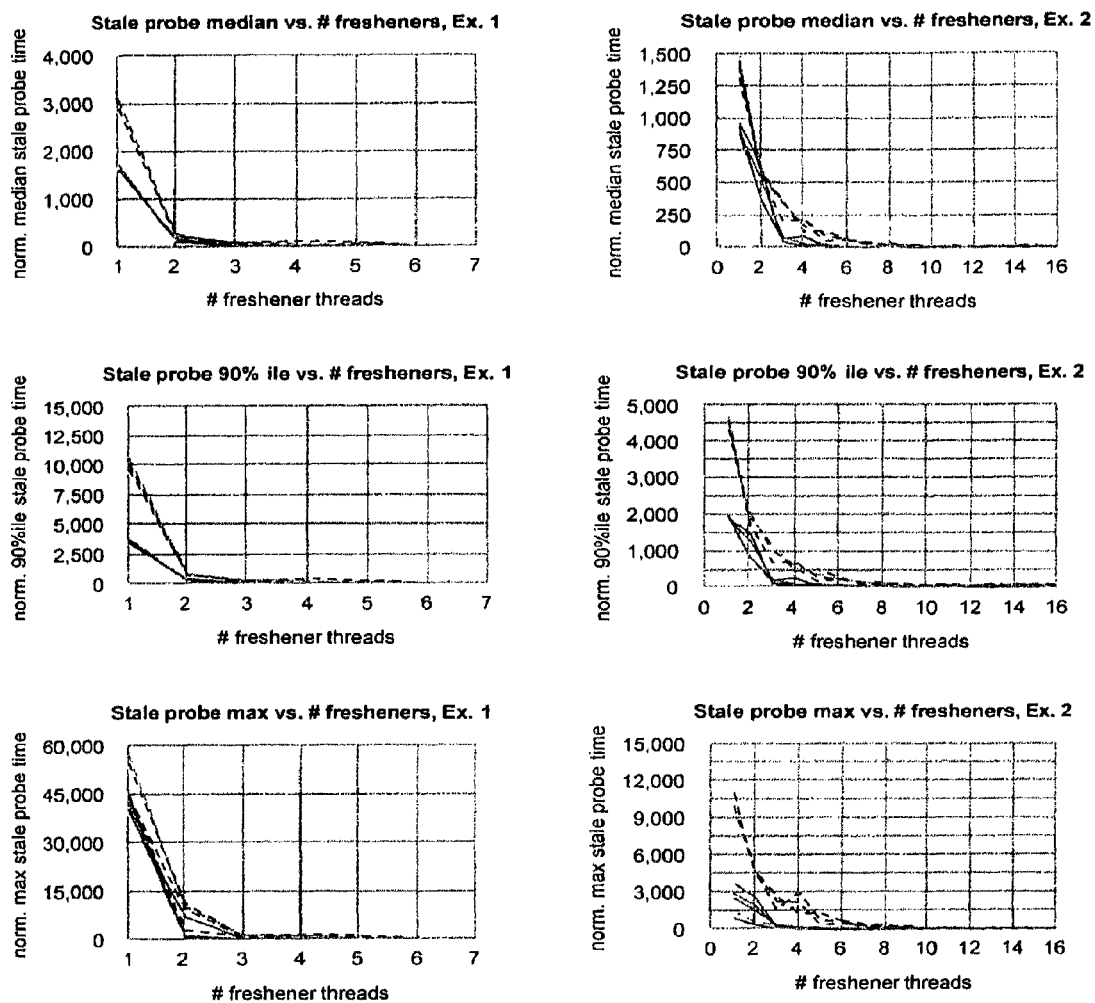
FIG. 9 illustrates a graphical comparison of a random freshening strategy vs. a round-robin freshening strategy with respect to reducing the degree of staleness of stale results returned by queries that return stale results, as the number of freshener threads increases, on each of two exemplary computing platforms in accordance with an exemplary aspect of the present invention.
Figure 10:
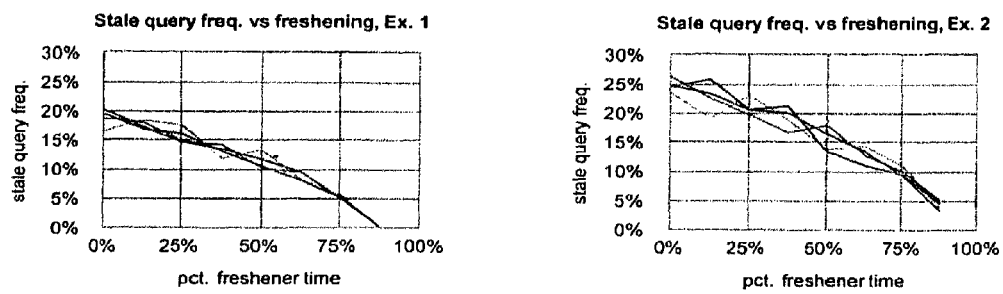
FIG. 10 illustrates a graphical comparison of a random freshening strategy vs. a round-robin freshening strategy with respect to reducing the frequency of queries returning stale results, as the split between worker threads and freshener threads varies, on each of two exemplary computing platforms in accordance with an exemplary aspect of the present invention.

Next, FIG. 9 illustrates the staleness duration, normalized to the mean probe time of each run. The medians and 90 percentiles are taken only from the stale probes, not the complete population of probe results. As above, each graph in FIG. 9 shows the results of four runs with random fresheners, depicted with dashed lines, and the results of four runs with round-robin fresheners, depicted with solid lines. In both Example 1 and Example 2, adding fresheners generally shortens stale times.

The final experiment combined the re-computation policy, which includes invalidation and optimization described above with the round-robin freshening policy. The experiment, run on the platforms of Example 1 and Example 2, employed a fixed number of cores, while varying the split between worker threads and freshener threads. In particular, on the eight-core system in Example 1, the experiment varied the number of workers from one to eight, with the number of fresheners consequently varying from seven to zero. On the system in Example 2 the number of workers varied from one to 16, with fresheners varying from 15 to zero. For both platforms, the x-axis is reported in terms of the percent of cycles devoted to freshening: zero for no fresheners, 50% for 8 workers and 8 fresheners, 87.5% for 1 worker and 7 fresheners. Rather than attempt to model a realistic workload, each worker spent half of its operations updating an entered value (chosen at random), and the other half querying an intermediate cell.

Figure 11:
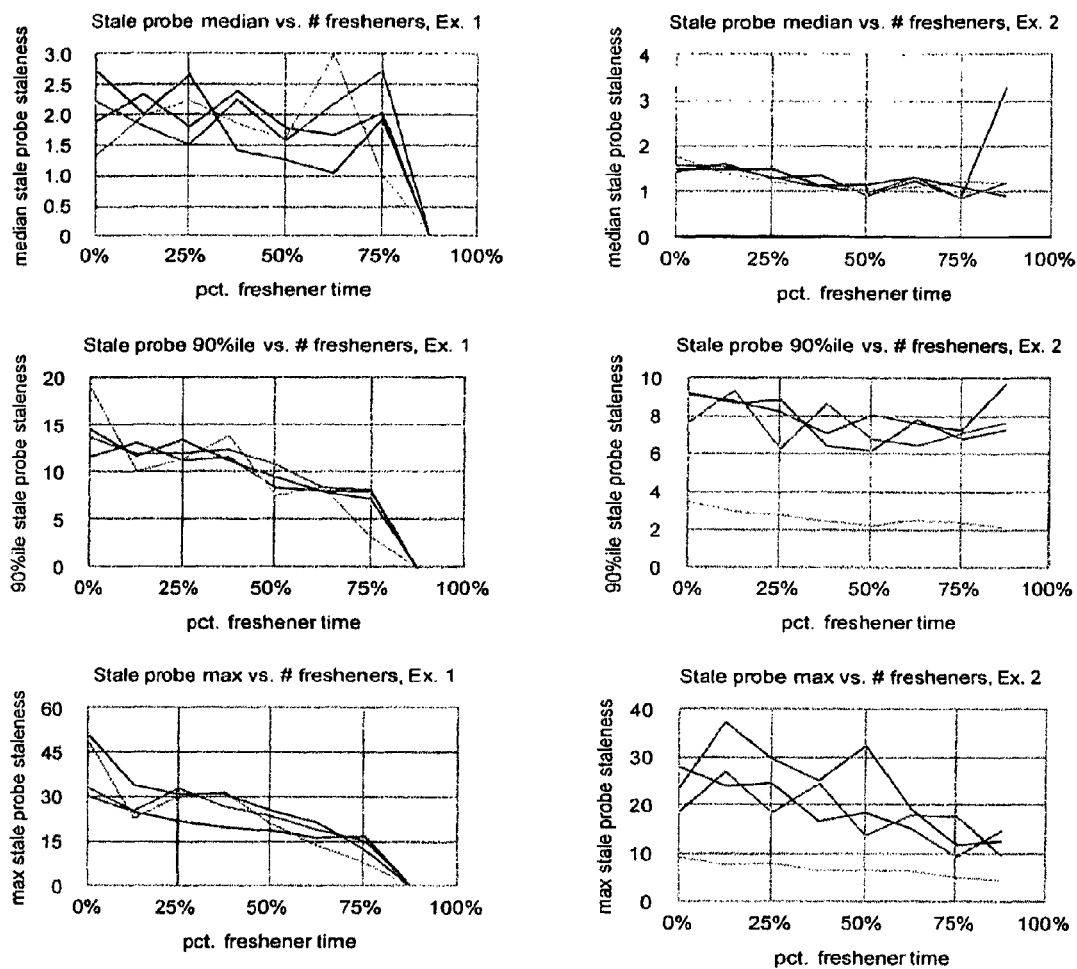
FIG. 11 illustrates a graphical comparison of a random freshening strategy vs. a round-robin freshening strategy with respect to reducing the degree of staleness of stale results returned by queries that return stale results, as the split between worker threads and freshener threads varies, on each of two exemplary computing platforms in accordance with an exemplary aspect of the present invention.

The results of the queries were measured as in the previous experiments. The graphs in FIG. 10 report the stale probe frequency, the fraction of query results that were stale. Each graph shows the results of four runs. FIG. 11 addresses the staleness duration, normalized as before to the mean probe times for each run. Each graph shows the results of four runs.

In view of the above, the inventors observed that adding synchronization reduced scalability. Furthermore, the inventors discovered that the straightforward optimization succeeded in reducing the rate of creation of stale results. Additionally, adding freshener threads (round-robin type and random) reduced the frequency and duration of stale results.

Figure 12:
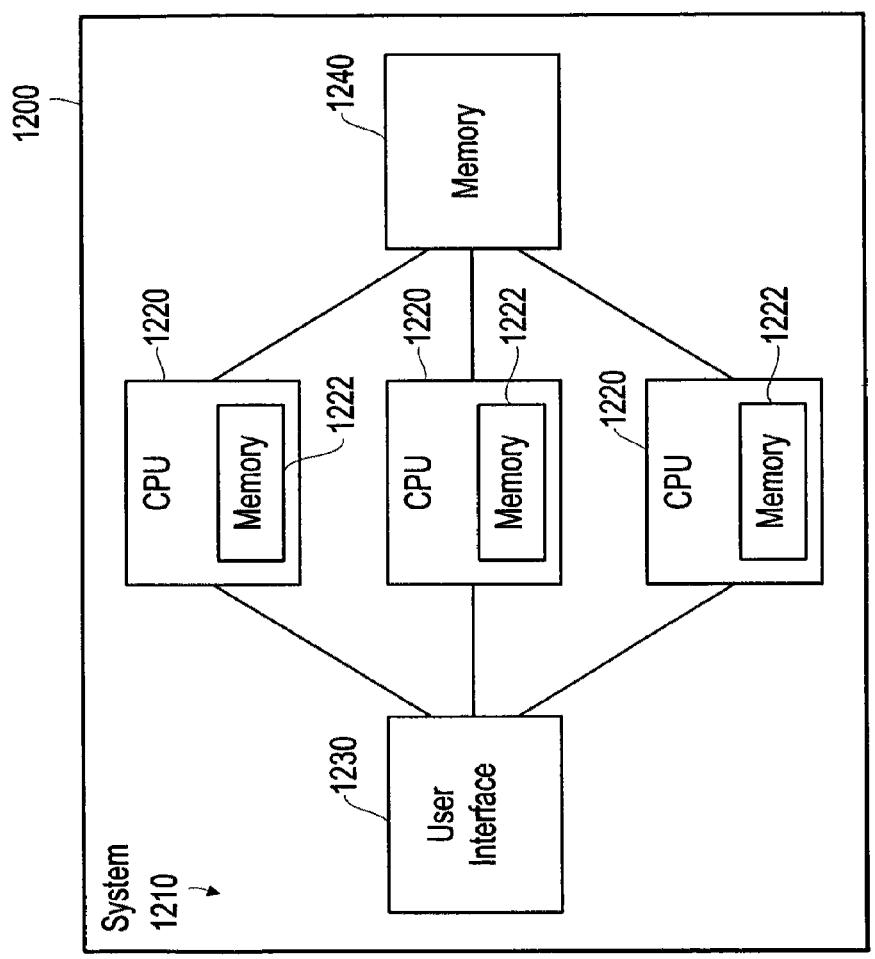
FIG. 12 illustrates a parallel computing system 1200 in accordance with an exemplary aspect of the present invention.

FIG. 12 illustrates a parallel computing system 1200 incorporating the system 1210 in accordance with certain exemplary embodiments of the present invention. The system 1210 includes one or more computer processing units 1220 accessible by one or more users through a user interface 1230. (FIG. 12 illustrates three CPUs. However, any number of CPUs may be employed). Each of the one or more computer processing units 1220 includes a memory 1222 having one or more storage units. The system 1210 also may include a memory 1240 having one or more storage units accessible to all CPUs. The one or more storage units include therein one or more data structures. The data structures may include a MOLAP cube made of a plurality of cells as is illustrated in, for example, FIGS. 1 and 2.

In accessing the data structures through the user interface 1230, one or more users may execute a plurality of activities. As discussed above, the activities include accessing or changing at least one common cell of the plurality of cells. The parallel computing system 1200 is configured such that the one or more users may simultaneously access a common data structure, without mutual synchronization among the activities and without locking the parallel computing system 1200.

The system 1210 is configured to remediate inconsistencies in the data structures, which may arise from more than one user simultaneously accessing the data structures.

With respect to the MOLAP cubes addressed by the present invention, the system calculates values in the cube based on inputs (e.g., similar to a spreadsheet). The system 1200 allows users to access and change, at any time, the values in the individual input cells. When a change is made, the system 1210 re-computes the values of computed cells. For every computed cell, the system maintains a cache of values. When a user modifies an input cell, the system marks the cache value for each dependent cell as invalid. A problem may arise when more than one party accesses a same cell without locking or synchronizing in the system. For purposes of the present invention, such an event is referred to as a race condition.

Figure 14C:
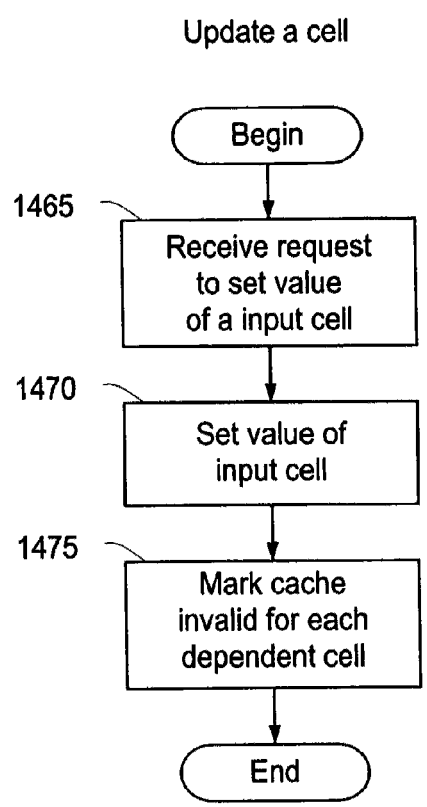
Figure 14D:
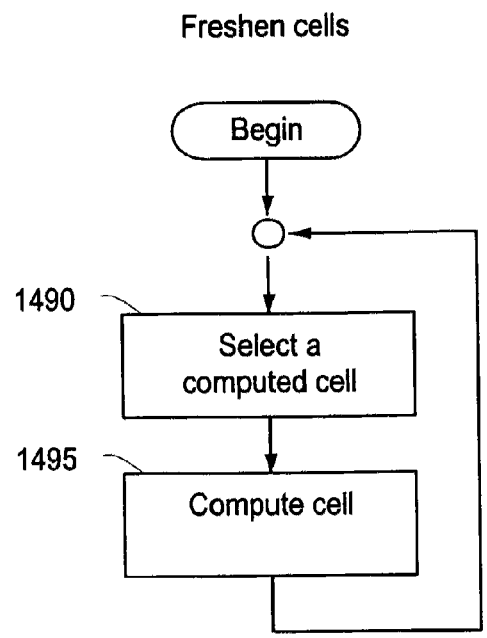

FIG. 14 illustrates a method according to certain exemplary embodiments of the present invention. A processing unit within the system 1210, discussed above and illustrated in FIG. 12, may be programmed to perform the method illustrated in FIG. 14.

Turning to the exemplary method, in a parallel computing system (e.g., as is illustrated in FIG. 12), access is provided to data structures, which are provided in one or more storage units (e.g., memory) within one or more computer processing units. A first request is received for a value of a cell in one of the data structures (1405). Then, an activity (e.g., accessing or changing a cell) is executed on the cell (1424). A new data value is then stored in the system cache based on the executed activity (1445).

Additionally, and possibly simultaneously, a second request is received (1465). Then, a second activity (e.g., accessing or changing a cell) is executed on a cell (1470). The second activity is possibly executed on the same cell that the first activity is executed.

The system 1210, illustrated in FIG. 12, begins at least one freshener thread. The freshener thread selects a cell to re-compute (1490). Then, the system 1210 updates a data value in the cache (1445). The freshener thread then repeats the process.

For example, FIG. 13 illustrates an example of one or more users simultaneously accessing a data structure and the inconsistencies or persistent stale values that may arise due to a race condition. At time T1, Thread 1 receives a request made by a user for the value of cell A (1405). At T2 the thread looks and sees that the cache for cell A is invalid (1422). At T3-T5 the system obtains the values of cells B, C, and D (1435), which are 10, 20, and 40 respectively, by way of example. At time T6, the system begins calculating the value of cell A (i.e., A=B+C+D) (1440).

At time T7, Thread 1 continues to calculate the value of A, while in Thread 2, a different user accesses cell D and modifies its value from 40 to 100 (1470). At time T8, Thread 1 continues to calculate the value of A, while in Thread 2, the system marks the cache for cell A invalid (1475).

At time T9, Thread 1 finishes calculating the value of A and at time T10 sets the value in the cache for cell A to 70 (i.e., A=B(10)+C(20)+D(40)=70) (1445). At T11, Thread 1 marks the cache for cell A valid (1450), and at T12 replies to the request for the value of cell A by returning the value 70 from the cache (1426).

Now, at time T13, in Thread 3, the system receives a request for the value of cell A (1405). The system, at T14, notes that the cache for cell A is flagged as valid (1422) and at time T15 replies to the request, in Thread 3, for the value of cell A by returning the value 70 from the cache (1426).

Due to the simultaneous access to the data structures, the value of cell A returned in thread 3 is stale—it is inconsistent with respect to the input cells on which it depends. That is, the value returned should have been 130 based on the change made in thread 2. However, due to the value 70 for cell A being marked valid in thread 1, the stale value was returned in thread 3.

As explained above, conventional techniques avoid this problem through synchronization or locking the system. For example, conventional techniques would lock the system before T2 of thread 1. The inventors have observed that synchronization and locking limit scalability and reduce system operating speed.

Accordingly, the system 1210, according to certain exemplary embodiments of the present invention, is configured to remediate inconsistencies in the data structures that arise from eliminating synchronization or locking. Instead, the system 1210 devotes one or more threads (e.g., freshener threads) that select a cell and re-compute its value in case it is a persistent stale value. That is, the freshener threads select a cell (1490), re-compute its value (1495), and restore the cache (1445). After re-computing, the cell is marked as valid in the cache (1450).

The freshener thread does not receive requests. Instead, the freshener thread selects cells to re-compute. The cells may be selected at random or in a round-robin pattern (i.e., all of the cells are selected in some specific order—e.g., from top to bottom, first to last, etc.). The freshener cell does not determine whether a cell is valid or invalid. The freshener thread merely selects a cell and re-computes its value. The selection is executed automatically and continuously by the system 1210. The number of freshener threads may be varied. However, as the number of freshener threads increases, the frequency and degree of staleness of returned results will decrease.

Exemplary Hardware Implementation

Figure 15:
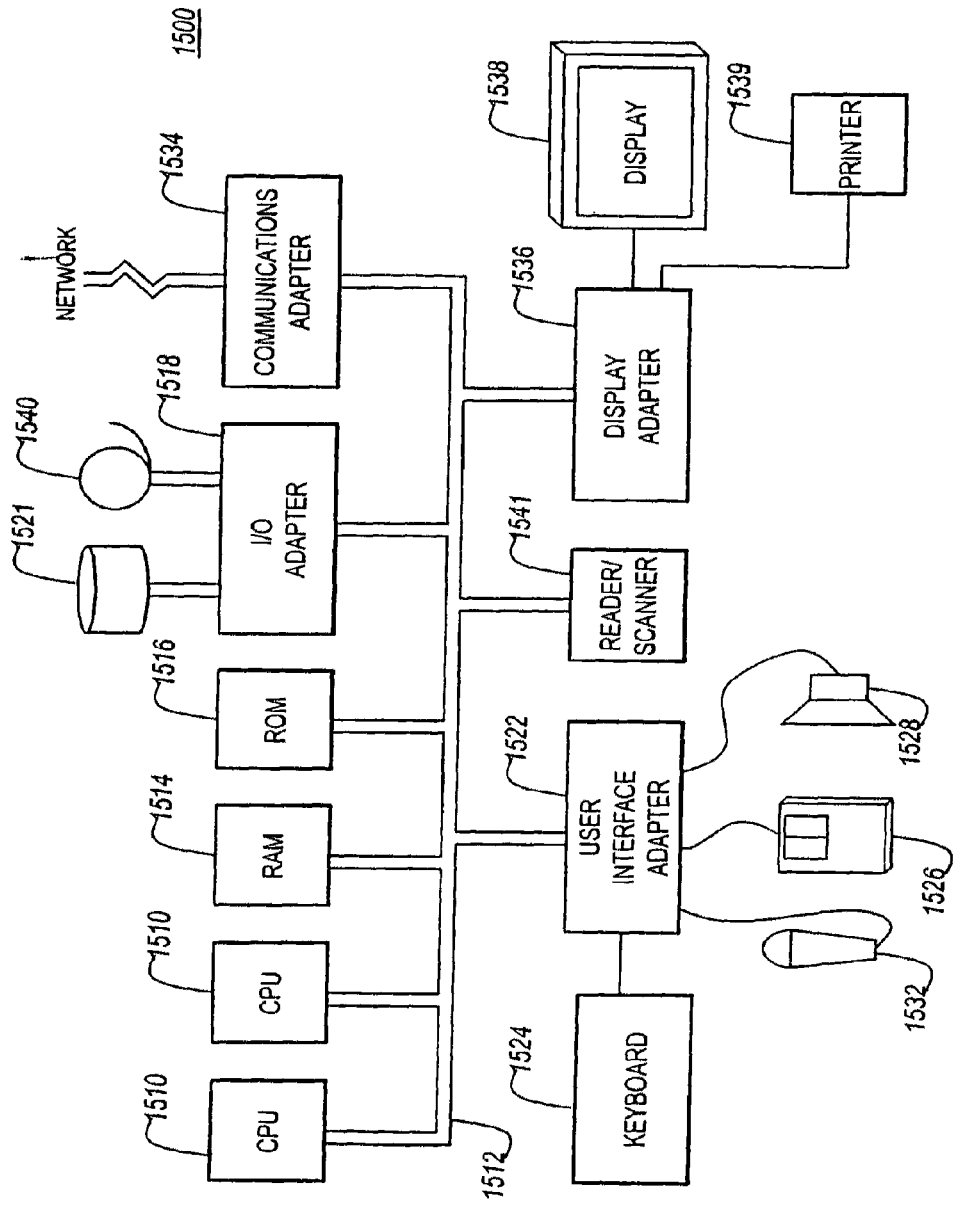
FIG. 15 illustrates a typical hardware configuration 1500 which may be used for implementing the inventive system and method according to the exemplary embodiments of the present invention.

FIG. 15 illustrates a typical hardware configuration 1500 which may be used for implementing the inventive system and method according to the exemplary embodiments disclosed herein. The configuration has preferably at least one processor or central processing unit (CPU) 1510. The CPUs 1510 are interconnected via a system bus 1512 to a random access memory (RAM) 1514, read-only memory (ROM) 1516, input/output (I/O) adapter 1518 (for connecting peripheral devices such as disk units 1521 and tape drives 1540 to the bus 1512), user interface adapter 1522 (for connecting a keyboard 1524, mouse 1526, speaker 1528, microphone 1532, and/or other user interface device to the bus 1512), a communication adapter 1534 for connecting an information handling system to a data processing network, the Internet, an Intranet, a personal area network (PAN), etc., and a display adapter 1536 for connecting the bus 1512 to a display device 1538 and/or printer 1539. Further, an automated reader/scanner 1541 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of storage media.

Thus, this aspect of the present invention is directed to a programmed product, including storage media tangibly embodying a program of machine-readable instructions executable by a digital data processor to perform the above method.

Such a method may be implemented, for example, by operating the CPU 1510 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 1510 and hardware above, to perform the method of the invention.

This storage media may include, for example, a RAM contained within the CPU 1510, as represented by the fast-access storage for example. Alternatively, the instructions may be contained in another storage media, such as a magnetic data storage diskette 1600 or compact disc 1602 (FIG. 5), directly or indirectly accessible by the CPU 1510.

Whether contained in the computer server/CPU 1510, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, C++, etc.

Synchronization is becoming prohibitively expensive when scaling to the levels of parallelism discussed above. Thus, unlike others who seek the smallest feasible amount of synchronization to guarantee consistency, in accordance with an exemplary aspect of the present invention, the method and system disclosed herein is able to eliminate synchronization entirely. Errors arising from data races are addressed by repair as opposed to prevention. An exemplary feature of the present invention is reducing the frequency and longevity of stale results. The freshener threads, as discussed above in certain exemplary embodiments of the present invention, are capable of reducing the frequency and longevity of stale results.

While certain exemplary embodiments disclosed herein discuss applications to a particular class of OLAP cubes, the present invention is not limited as such. Indeed, the method and system disclosed herein may also be applied to other domains.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method, said method comprising:
   providing a memory including a plurality of named locations in a Multidimensional Online Analytic Processing ("MOLAP") cube technology comprising interactive, concurrent updates, each named location holding a value; and
   introducing at least one freshener, said at least one freshener choosing one of said plurality of named locations and re-computing said value of said one of said plurality of named locations independent of a user's input.

2. The method according to claim 1, wherein said plurality of named locations comprises at least one of an input named location and a computed named location.

3. The method according to claim 2, wherein said input named location holds a value provided by an external request.

4. The method according to claim 2, wherein said computed named location holds a value computed based on values of other named locations.

5. The method according to claim 2, wherein a value of said computed named location is saved in cache corresponding to said computed named location.

6. The method according to claim 5, wherein said cache comprises a flag indicating whether the cache is valid.

7. The method according to claim 6, wherein a plurality of threads concurrently and independently access at least one of said plurality of named locations, said cache, and said flag.

8. The method according to claim 7, wherein said threads access said at least one of said plurality of named locations, said cache, and said flag without synchronization.

9. The method according to claim 1, wherein said at least one freshener comprises one of a plurality of fresheners.

10. The method according to claim 1, wherein said choosing one of said plurality of named locations and re-computing its value is conducted at random.

11. The method according to claim 1, wherein said choosing one of said plurality of named locations and re-computing its value is conducted in a round-robin pattern.

12. The method according to claim 1, wherein a number of said at least one freshener is set based on a degree of desired consistency.

13. The method according to claim 1, wherein a number of said at least one freshener is set based on a number of stale probes permissible per unit of time.

14. The method according to claim 1, wherein a number of said at least one freshener is set by a user statically.

15. The method according to claim 1, wherein a number of said at least one freshener is set by a system dynamically based on a user's specification of permissible staleness characteristics.

16. The method according to claim 1, wherein said at least one freshener is introduced automatically without a request.

17. The method according to claim 1, wherein said at least one freshener is continuously introduced.

18. The method according to claim 1, wherein said at least one freshener chooses said one of said plurality of named locations and re-computes its value without determining whether the chosen name location is valid.

19. The method according to claim 4, wherein the value of said computed named location is computed based on at least one of an aggregation of the values of the other named locations and an evaluation of a formula that refers to the values of the other named locations.

20. A system, comprising:
a memory including a plurality of named locations in a Multidimensional Online Analytic Processing ("MOLAP") cube technology comprising interactive, concurrent updates, each named location holding a value; and
a processing unit that introduces at least one freshener, said at least one freshener choosing one of said plurality of named locations and re-computing said value of said one of said plurality of named locations independent of a user's input.

21. A non-transistory computer-readable storage medium tangibly embodying a program of computer-readable instructions executable by a digital processing apparatus to perform a method, said method comprising:
providing a memory including a plurality of named locations in a Multidimensional Online Analytic Processing ("MOLAP") cube technology comprising interactive, concurrent updates, each named location holding a value; and
introducing at least one freshener, said at least one freshener choosing one of said plurality of named locations and re-computing said value of said one of said plurality of named locations independent of a user's input.

22. A parallel processing computer system, comprising:
one or more computer processing units comprising one or more storage units having one or more data structures in a Multidimensional Online Analytic Processing ("MOLAP") cube technology comprising interactive, concurrent updates, said data structures comprising a plurality of cells, said cells holding a value; and
a processing unit that introduces at least one freshener, said at least one freshener choosing one of said plurality of cells and re-computing said value of said one of said plurality of named locations independent of a user's input.

23. The system according to claim 22, further comprising two or more activities that are executed on the system, at least two of the activities being simultaneously executed on the system, the at least two of the activities comprising accessing or changing at least one common cell of the plurality of cells, without mutual synchronization among the activities.

24. The system according to claim 23, wherein the two or more activities are executed on the system without locking the system.

* * * * *